(12) United States Patent
Olsen et al.

(10) Patent No.: US 8,392,655 B2
(45) Date of Patent: Mar. 5, 2013

(54) APPARATUS FOR REDUCING ACCESSES TO LEVELS OF A STORAGE HIERARCHY IN A COMPUTING SYSTEM

(75) Inventors: Michael Claus Olsen, Cortlandt Manor, NY (US); Frederick Douglis, Basking Ridge, NJ (US); Marcel-Catalin Rosu, Ossining, NY (US); Thomas Richard Hildner, Cary, NC (US)

(73) Assignee: Lenovo (Singapore) PTE Ltd., Singapore (SG)

( * ) Notice: Subject to any disclaimer, the term of this patent is extended or adjusted under 35 U.S.C. 154(b) by 1227 days.

(21) Appl. No.: 10/674,926

(22) Filed: Sep. 30, 2003

(65) Prior Publication Data

US 2005/0071561 A1 Mar. 31, 2005

(51) Int. Cl.
*G06F 12/00* (2006.01)
(52) U.S. Cl. .......................... 711/118; 711/154; 713/320
(58) Field of Classification Search .................. 711/118, 711/154; 713/320
See application file for complete search history.

(56) References Cited

U.S. PATENT DOCUMENTS

| 5,898,880 | A * | 4/1999 | Ryu .............................. 713/323 |
| 5,937,433 | A * | 8/1999 | Lee et al. ...................... 711/158 |
| 6,029,249 | A * | 2/2000 | Atkinson ....................... 713/323 |
| 6,415,359 | B1 * | 7/2002 | Kimura et al. ................ 711/137 |
| 6,647,499 | B1 * | 11/2003 | Morcom ....................... 713/300 |
| 6,836,824 | B1 * | 12/2004 | Mirov et al. .................. 711/118 |
| 2003/0009705 | A1 * | 1/2003 | Thelander et al. ............ 713/340 |
| 2004/0010671 | A1 * | 1/2004 | Sampsa et al. ............... 711/165 |
| 2004/0255283 | A1 * | 12/2004 | Rudelic et al. ............... 717/151 |

* cited by examiner

*Primary Examiner* — Matthew Bradley
(74) *Attorney, Agent, or Firm* — Michael J. Buchenhorner

(57) ABSTRACT

An information processing system comprises first and second levels of a storage hierarchy, wherein accessing information in the first level consumes more energy than accessing information in the second level; and a processor for writing information to the second level of storage based on energy-conserving criteria. The energy-conserving criteria comprise a set of heuristics, including system state information and user preferences.

16 Claims, 3 Drawing Sheets

APPARATUS FOR REDUCING ACCESSES TO LEVELS OF A STORAGE HIERARCHY IN A COMPUTING SYSTEM

CROSS-REFERENCE TO RELATED APPLICATIONS

Not Applicable.

STATEMENT REGARDING FEDERALLY SPONSORED-RESEARCH OR DEVELOPMENT

Not Applicable.

INCORPORATION BY REFERENCE OF MATERIAL SUBMITTED ON A COMPACT DISC

Not Applicable.

FIELD OF THE INVENTION

The invention disclosed broadly relates to the field of information processing systems and more particularly relates to the field of memory management systems.

BACKGROUND OF THE INVENTION

Computers use a variety of technologies for storing data. Some consume more system resources than others. "Non-volatile storage" refers to storage that survives events such as the loss of power or reboot of a computer. All long-lived data must reside in non-volatile storage for persistence. Hard-disk drives (HDDs, also known as magnetic disk drives) are the most common example of non-volatile mass storage. Data that are stored on an HDD can also be temporarily stored in other media with faster read or write time to improve access performance. These media could be alternate non-volatile memory such as Flash memory, magnetic RAM (MRAM) or volatile memory such as dynamic random access memory (DRAM) or Static RAM (SRAM). A number of other technologies exist which offer additional trade-offs in the decision of where to store data. In addition to technologies within the system, data may be stored and/or cached over a network on a remote storage system.

Portable computers with HDDs, such as notebooks and some personal digital assistants (PDAs), suffer from reduced battery life due to HDD accesses when reading or updating files. Using a DRAM as a read cache, while done initially solely for performance considerations, is known to have additional benefits in reducing energy consumption by eliminating the need for accesses to the HDD. Some in the industry have proposed using large non-volatile caches to temporarily hold all write content for the HDD. Buffering writes in a cache can improve performance by permitting an application to proceed without waiting for an HDD operation to complete, and it can further benefit a portable computer by permitting the HDD to spin down while inactive, saving energy. When the cache is full, or the HDD is accessed to read a file, the cached content is written out to the HDD. Three HDD-related power components are saved in this fashion: 1) the idle spin power; 2) the access power; and 3) the power related to managing the multiple performance modes after each access.

There are several tradeoffs among different memory types. The disadvantages of using system memory (SRAM or DRAM) only to cache data are high cost, limited capacity, and non-volatility. MRAM is not a commercially available technology yet and is likely to be expensive at first. Flash suffers from two issues, namely limited erase-write cycles and slow erase times. Networked storage may be slow, unreliable and unavailable in remote areas.

Efficiently managing the available capacity of a cache is important with respect to several metrics: performance; power consumption; and device lifetime (when accesses are limited). A typical methodology for controlling a cache in a memory or storage hierarchy is to treat all cache entries as equivalent, then replace each entry using a heuristic that attempts to cache the data that are most likely to be accessed again in the near future. Heuristics are algorithms/functions proved to work in 'most' cases, i.e., algorithms that return one of the best solutions, not necessarily the best one. Heuristics are used when there is no known algorithm for computing the best solution or when the 'best-solution' algorithm exists but it is too expensive in terms of system resources to run it. The most common heuristic is to expel the "least recently used" data when there is no room in the cache to hold new data. Optimizations of this heuristic account for such things as large, sequential read accesses that are known a priori to be unlikely to be repeated during the interval the data would be cached; such data can be omitted from the cache to avoid flushing more useful data.

Therefore, there is a need for a system and method for preserving information based on energy-conserving criteria important to users of portable information processing systems.

SUMMARY OF THE INVENTION

An information processing system comprising a module for managing a storage system comprising a plurality of levels of storage; wherein the module makes a decision on writing information to a level in the storage based on energy-conserving criteria.

DETAILED DESCRIPTION

Figure 1:
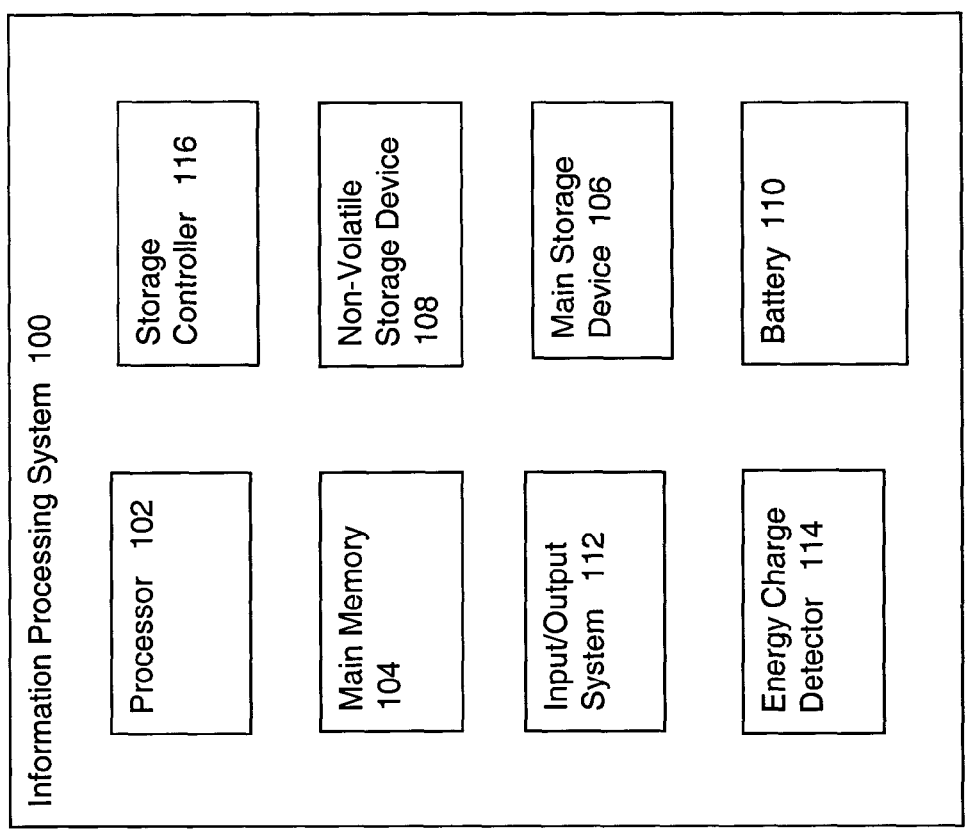
FIG. 1 shows a high-level computer system configuration according to an embodiment of the invention.

To facilitate a clear understanding of the present invention, definitions of terms employed herein will now be given.

The term "storage device" is defined as a medium onto which digital data can be written and read and which preserves the data. Examples of storage devices include magnetic, electronic, optical, heat-based and mechanical media.

The term "storage system" is defined as a storage device which is accessed and managed by one of more software modules. Typically, one of these software modules is the device driver. The file system using the storage device driver may also be considered part of the storage system.

The term "cache" is defined as any type of storage device in which data typically reside only temporarily. As used herein the cache may either contain a duplicate copy of data stored in permanent mass storage or it may contain unique copies of data not stored elsewhere in the system.

The term "main storage" is defined as any type of storage device in which data typically reside permanently or which holds the permanent copy of data typically used by a computing system. Both caches and main storage may be located in many places, but typically the main storage is a hard-disk drive, and the "cache" is kept in system memory (DRAM).

The term "non-volatile" storage is defined as storage which preserves stored data for a very long time even after the main power supply to the storage system has been removed.

The term "energy-conserving criteria" is defined as any operating conditions or factors that affect the use of energy. Energy-conserving criteria comprise one or more of the following: system state information; storage input/output using one or more specific files; storage input/output associated with one or more specific software applications; reading or writing data to a hard disk drive, and downloading or uploading data from or to a network storage resource. Another energy-conserving criterion is whether the computer system is powered from a power source external to the computer or its battery. When the system is powered from a power source external to the computer system, such as an AC adapter, it is considered that there is no system resource (such as a battery) to be preserved.

The term "throughput" (TP) is defined as the amount of data per unit time handled by the system at any given time.

According to an embodiment of the invention the energy-conserving issues discussed above are solved by using a second level storage device (in the following, briefly referred to as cache), that consumes less energy than the first level (main system storage) in circumstances where power savings are desired. The existence of such circumstances is determined by reference to energy-conserving criteria (defined herein). An ideal system would use this additional level of memory ("intermediate storage") to reduce the amount of access to the "main storage" while maintaining data integrity. This memory would usually be non-volatile, such as Flash memory. This would be an advantage as it would increase battery life to the system. In addition, it could add a level of redundancy to critical data for protection from HDD failures.

Moreover, according to another embodiment of the invention, the wearability and latency issues of Flash are solved by an apparatus and method which stores only strategically selected storage data in a second level of storage (such as a Flash cache) that consumes less energy than storage in a first storage level such as main system storage. It should be noted that the cache could be based on any type of storage device, including those mentioned above, and that this cache may be accessed in many different ways, including through a network.

FIG. 1 shows a high-level computer system configuration using an embodiment of the invention. An information processing system 100 comprises a processor or CPU 102, a system main memory 104 (e.g., random access memory or RAM) for temporary storage of data and/or instructions (collectively "information" or "data") to be processed by the processor 102, a main storage device (e.g., a HDD) 106, non-volatile storage device 108 (e.g., "Flash"), a portable power source such as a battery 110, and an input/output subsystem 112 comprising any of several I/O devices such as a display, keyboard and mouse and a network interface which can be a radio-frequency (RF) interface. The RF interface preferably communicates with an RF network that includes RF units (such as base stations or wireless network access points) that are coupled to storage facilities such as databases. The system 100 further comprises an arbiter or storage controller 116 for controlling the information to be written to the non-volatile storage device 108. The system 100 also can be equipped with a charge detector module 114 to determine the amount and type of energy used by the system 100.

It is known that accessing a main storage device such as HDD 106 consumes more energy than accessing information stored in random-access media such as the main memory 104. As used herein, "accessing includes the general operation of the storage levels in a HDD (such as spin-up, spin-down, idle spinning). According to an embodiment of the invention, the system 100 manages the storage levels of the system 100 such that in conditions wherein energy conservation is important, information is written to the non-volatile Flash cache 108 (a second level of storage) as opposed to the HDD 106 (first level storage). The determination of whether a condition exists wherein energy conservation is important is performed based on a set of predetermined criteria called energy-conserving criteria. These criteria can be compiled using a heuristic approach.

In the preferred embodiment, the computer system 100 is a laptop computer running the Windows XP operating system (OS). The laptop 100 is equipped with a 36 GB HDD 106 (i.e., the main storage), 256 MB of system memory (DRAM) 104 (the primary "cache"), and an additional 128 MB of Flash memory 108 (the "intermediate storage") which is preferably attached to the computer in the form of a Flash PCMCIA card (or optionally integrated into the system board). The file systems used by the OS are the NT file system (NTFS) for the HDD 106 and the FAT16 file system for the Flash card 108. Optionally, the cache 104 may be integrated into the HDD 106 along with a processing system, such as an ASIC, for managing the cache 104 according to energy-conserving criteria.

The system 100 stores system state information and can also store user profiles. These data can be used as energy-conserving criteria, in addition to any heuristically-determined criteria.

It should be understood that a system 100 according to the invention is not limited to the configuration described herein and will apply to any storage hierarchy based on the system designer's requirements. The system 100 manages levels of a storage hierarchy by taking additional information or energy-conserving criteria into account, which is not considered in existing systems. The energy-conserving criteria include limiting the use of a cache to specific files or parts of files, such as parts of a file system or files accessed by a specific application; the amount of power being used by the system 100; the remaining life of the battery 110 (e.g., running low on charge); dynamically determining whether to cache depending on the current system state, such as whether an HDD 104 is currently spinning, and what current throughput demands are; and adjusting cache policies as a function of certain metrics, such as expected battery lifetime or Flash erasure cycles.

In another embodiment according to the invention, the method described above can also be implemented as an application-specific integrated circuit (ASIC).

We now discuss the caching mechanism. Storage data are cached at the HDD cluster block level. A cluster block, in NTFS, is typically 4 KB large, and represents, in this embodiment, the smallest data unit a file system can access on the HDD. When a Flash PC card is detected by the operating system, typically the OS also installs a file system for the Flash card. In the preferred embodiment we shall package each disk block into a file which in turn is saved on the Flash. To make the mapping between disk block and cache files as simple as possible, we shall simply name each cache file with the logical cluster number (LCN), thus implementing a unique efficient mapping between disk clusters and cache files. For example, the disk block with LCN=1234 will be cached as a file whose character file name is "1234".

At some point it becomes necessary to flush the cache to the HDD. In this embodiment we shall flush the cache data in FIFO (first in, first out) order. We denote the size of the cache as Ncache (for example, Ncache=128 MB). We denote the flushing threshold of the cache as Nth at which the content of the cache must be flushed (i.e., written) to the HDD (for example, Nth=0.75*Ncache=96 MB). Thus when the cache reaches a specified capacity (e.g., 75% full), the flushing operation is started. Since this operation may cause the HDD to spin up, it is useful, from an energy perspective, to reduce the likelihood of spin-up. This may be accomplished by using an HDD access that is already taking place. In this way, HDD spin-ups due to cache overflow are minimized.

As mentioned above, a Flash medium must first be erased before data can be written to it. Since the erasing process is very slow (about 1 MBps), the most optimal time to perform this operation is immediately following the flushing operation.

When the laptop is powered from an AC adapter, no storage data are cached, i.e., all storage data are ignored and passed directly to the HDD 106. Preferably, when the laptop 100 is powered by the battery 110, only "persistently low-throughput" storage data are cached.

Figure 2:
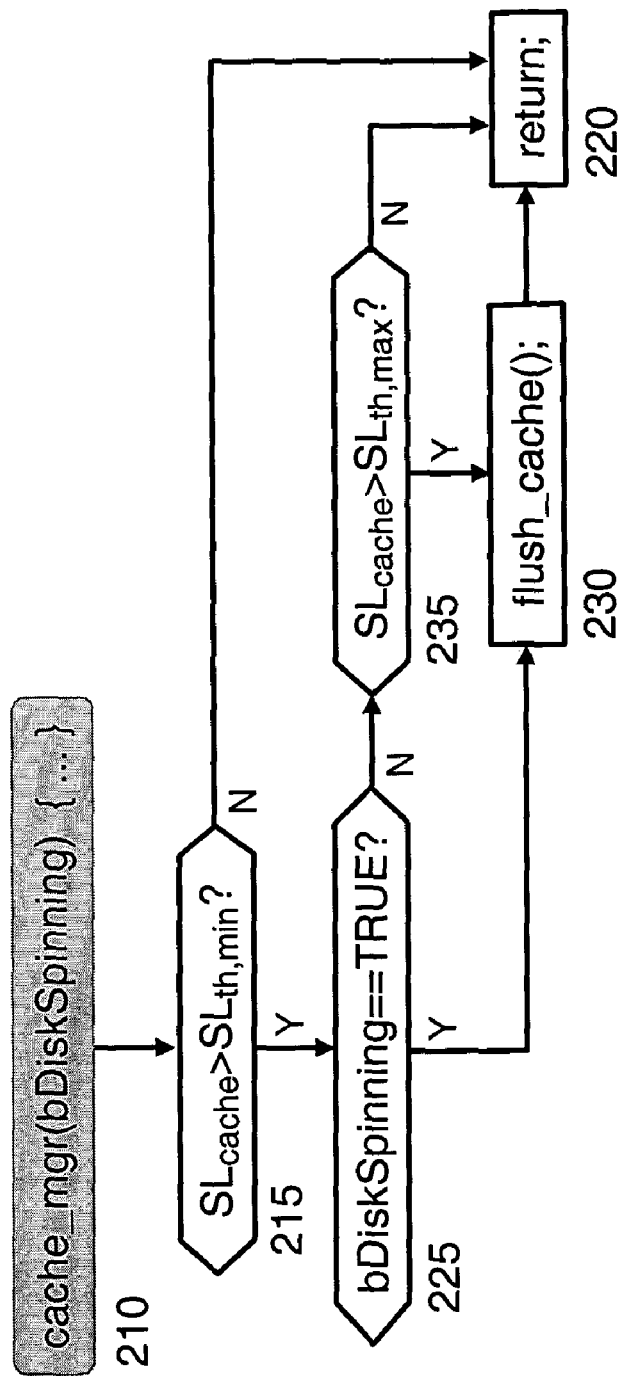
FIG. 2 is a flow-chart illustrating a method for managing the cache, according to an embodiment of the invention.

FIG. 2 shows a flow-chart illustrating a method for managing the cache. Whenever disk activity is detected (i.e., a read or write operation) or whenever a cache write operation is detected, the cache_mgr( ) routine in step 210 in FIG. 2 is called after the disk or cache operation has completed. In cache_mgr( ) it is first determined in step 215 if the cache storage level ($SL_{cache}$) is greater than a minimum threshold value for the storage value ($SL_{th,min}$). Note that the storage level (SL) is a relative measure of how full the cache is, e.g., $SL_{th,min}$=75%. If the answer in step 215 is NO, no action is taken and the routine returns in step 220. If the answer is YES then in step 225 it is next determined if the disk 106 is already spinning. If the disk 106 is spinning then in step 230 the cache is flushed in the order of oldest data first (FIFO) until the storage level is zero, i.e., all data are written to disk 106 and then the cache is erased. If the disk 106 is not spinning, then in step 235 it is determined if the storage level exceeds the maximum allowable storage level ($SL_{th,max}$), e.g., $SL_{th,max}$=90%. If the answer is YES then the cache is flushed in step 230. If the answer is NO then no action is taken and the routine returns.

The determination as to whether the throughput (TP) is persistently low, or similarly persistently high, is determined as follows. Generally speaking, TP should be considered too high if TP approaches the worst-case speed, $TP_{cache,wc}$, with which the data blocks can be saved in the cache. This worst-case speed would be governed by the erase speed of the Flash 108, which may typically be 1 MByte/s, but which generally is specific to the particular Flash device deployed in the system, and could be significantly slower or faster than 1 MByte/s. The way to determine if TP is too high is to periodically calculate the average throughput, $TP_{avg}$, of the last $N_{cache}$ data written into cache, i.e., $TP_{avg}=N_{cache}/T$, where T is the time is took to save the last $N_{cache}$ data into the cache. The rules in Equation 1 (set forth below) are used in the preferred embodiment.

Persistently low (caching): $TP_{avg}<0.33*TP_{cache,wc}$

Persistently high (no caching): If $TP_{avg}>0.66*TP_{cache,wc}$ (Equation 1)

The reason for the separate thresholds is to cause hysteresis, to avoid thrashing between the high and low throughput regions. In other words, caching will be stopped when the system enters into the persistently high region, and caching won't resume until the throughput returns to the persistently low region.

There may be certain HDD data that have a high likelihood of being read-accessed and which should always be in cache, and which should not be flushed. This is to avoid a likely HDD access when frequently reading the data from within a target group of data. In other words, there are regions in the cache which are set up as non-flushable. Such critical data may include file data from the Cookies and Favorites directories when using a web browser since it is highly likely that the cookies and bookmarks are read from the HDD while a user surfs the web. The Cookies and Favorites directories would be copied into the Flash file system when the first cookie or first bookmark is read from the Cookies or Favorites directory. Then when the browser application is closed, the non-flushable region may be freed and used for regular caching purposes.

Figure 3:
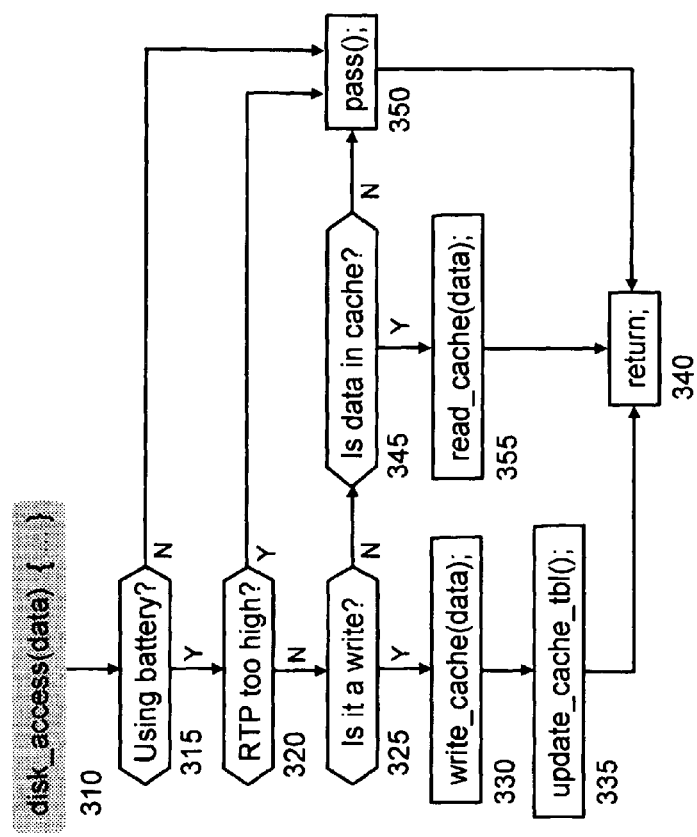
FIG. 3 is a flow chart illustrating a method according to the invention.

Referring to FIG. 3 there is shown another method according to an embodiment of the invention. In FIG. 3, whenever a disk operation occurs (i.e., either a read or a write access), the disk_access( ) routine in step 310 is called. In step 315 it is first determined if the computer system is running off the battery power source. If the answer is YES, it is next determined in step 320 if the relative throughput (RTP) is too high according to Equation 1. If the answer is NO, it is next determined in step 325 if the routine was called to carry out a write operation. If the answer is YES, the data are written to cache in step 330, the cache table is then updated accordingly in step 335 and the routine returns in step 340. If the system is not running on battery (the answer in step 315 is NO), then in step 350 the request is passed on to the disk driver. Likewise, if the system is running on battery, but the RTP is too high, the request is passed on to the disk driver. If the answer in step 325 is NO, then it is a disk read operation, and it is therefore first determined in step 345 if the data to be read are already in cache. (This is done by inspecting the cache table, according to known methods.) If the answer is NO then in step 350 the read request is passed on to the disk driver. If the answer is YES, then the data are retrieved from the cache in step 355 after which the routine returns in step 340.

What has been shown and discussed is a highly-simplified depiction of an information processing system. Those skilled in the art will appreciate that other low-level components and connections are required in any practical application of a computer apparatus. Therefore, while there has been described what is presently considered to be the preferred embodiment, it will be understood by those skilled in the art that other modifications can be made within the spirit of the invention.

We claim:

1. An information processing system comprising:
   first and second levels of a non-volatile storage hierarchy, wherein accessing information in the first level consumes more energy than accessing information in the second level; and
   a processor configured for writing information to the second level of storage based on energy-conserving criteria, wherein the energy-conserving criteria comprise system state information, and wherein said system state information is selected from a type of energy source powering the system.

2. The system of claim 1 wherein the energy-conserving criteria comprise criteria compiled using a heuristic approach.

3. The system of claim 1 further comprising a storage input/output subsystem and wherein system state information comprises whether the storage input/output subsystem is using one or more specific files.

4. The system of claim 3 wherein the system state information is further selected from a group consisting of:
   storage input/output data associated with one or more predetermined software applications;
   a sequence of storage input/output operations; and
   observed interactions with the first level of the non-volatile storage hierarchy and wherein the collection of heuristics infer a state of the second level of the non-volatile storage hierarchy.

5. The system of claim 4 wherein the system stores current user profiles and the system state information comprises whether storage input/output data are associated with a current user profile.

6. The system of claim 4 wherein the system stores current user preferences and the system state information comprises whether storage input/output data are associated with current user preferences.

7. The system of claim 3 wherein the system state information comprises at least one factor from among the following factors:
   storage input/output data associated with characteristics of a connection between the first and second levels of the non-volatile storage hierarchy;
   the storage input/output data associated with characteristics of a connection between the system and at least one second level of the storage hierarchy;
   a proximity of the storage input/output data to events that change the state of the at least one first level of the non-volatile storage hierarchy;
   the proximity of the storage input/output data to a previous interaction with at least one first level of the non-volatile storage hierarchy;
   an indication of a hard-disk drive spin-down event; and
   physical characteristics of the second level of the non-volatile storage hierarchy.

8. The system of claim 1 wherein the energy-conserving criteria comprise limiting use of parts of a file system.

9. The system of claim 1 wherein the system state information comprises physical characteristics of the second level of the non-volatile storage hierarchy.

10. The system of claim 1 wherein the second level of the non-volatile storage hierarchy is implemented using Flash memory.

11. The system of claim 1 wherein the system state information comprises the number of remaining write cycles.

12. The system of claim 1 wherein the processor is for removing information from the second level of the non-volatile storage based on energy-conserving criteria.

13. The system of claim 1 wherein the second level of the non-volatile storage further comprises: a mapping schema between cache files in the second level of the non-volatile storage and disk files in the first level of the non-volatile storage, wherein each cache file is named with a logical cluster number of its corresponding disk file.

14. The system of claim 1, further comprising:
   a hard disk drive, the hard disk drive comprising rotating magnetic media comprising the first level of the non-volatile storage and a cache comprising the second level of the non-volatile storage; and
   an application-specific integrated circuit for managing the cache according to the energy-conserving criteria.

15. A method for managing storage of information in an information processing system comprising two levels of non-volatile storage wherein a first level is managed and a second level is unmanaged wherein storing information in managed storage consumes less energy than storing information in unmanaged storage, the method comprising:
   monitoring the information processing system to determine whether an operating state of said information processing system satisfies one or more energy-conserving criteria;
   storing only strategically selected storage data in managed storage when the operating state of the information processing system satisfies the one or more energy-conserving criteria; and
   storing all storage data in unmanaged non-volatile storage when the operating state of the information processing system does not satisfy the one or more energy-conserving criteria;
   wherein the energy-conserving criteria comprise system state information, and wherein said system state information is selected from a type of energy source powering the system.

16. A non-transitory computer readable medium comprising program instructions for:
   monitoring a system to determine whether an operating state of the system satisfies one or more energy-conserving criteria;
   storing only strategically selected storage data in managed non-volatile storage when the operating state of the system satisfies the one or more energy-conserving criteria; and
   storing all storage data in non-managed non-volatile storage when the operating state of the system does not satisfy the one or more energy-conserving criteria;
   wherein the energy-conserving criteria comprise system state information, and wherein said system state information is selected from a type of energy source powering the system.

* * * * *